J. HORINEK.
AGRICULTURAL IMPLEMENT.
APPLICATION FILED JUNE 3, 1908.
916,868.
Patented Mar. 30, 1909.
2 SHEETS—SHEET 1.
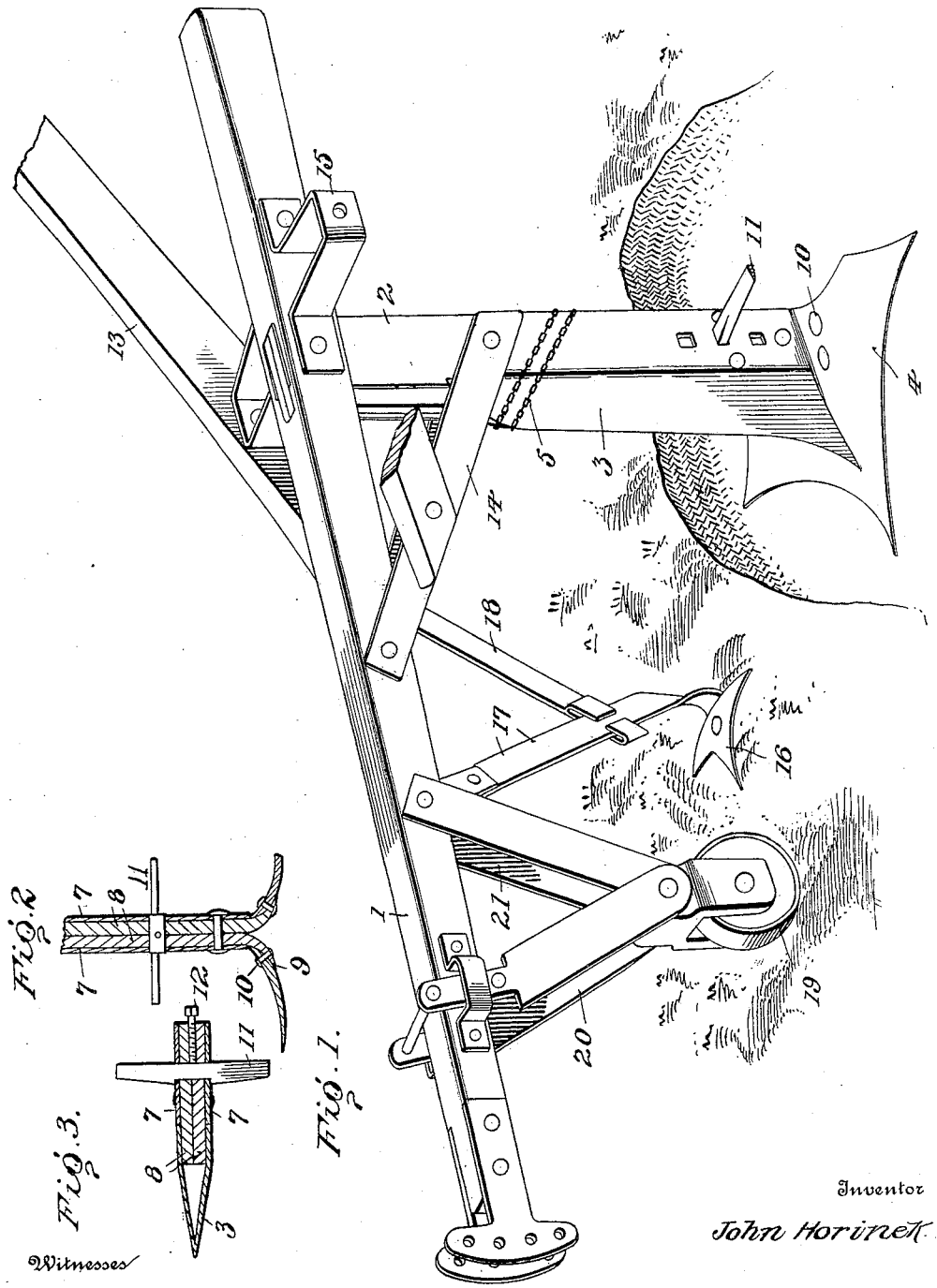
Inventor
John Horinek

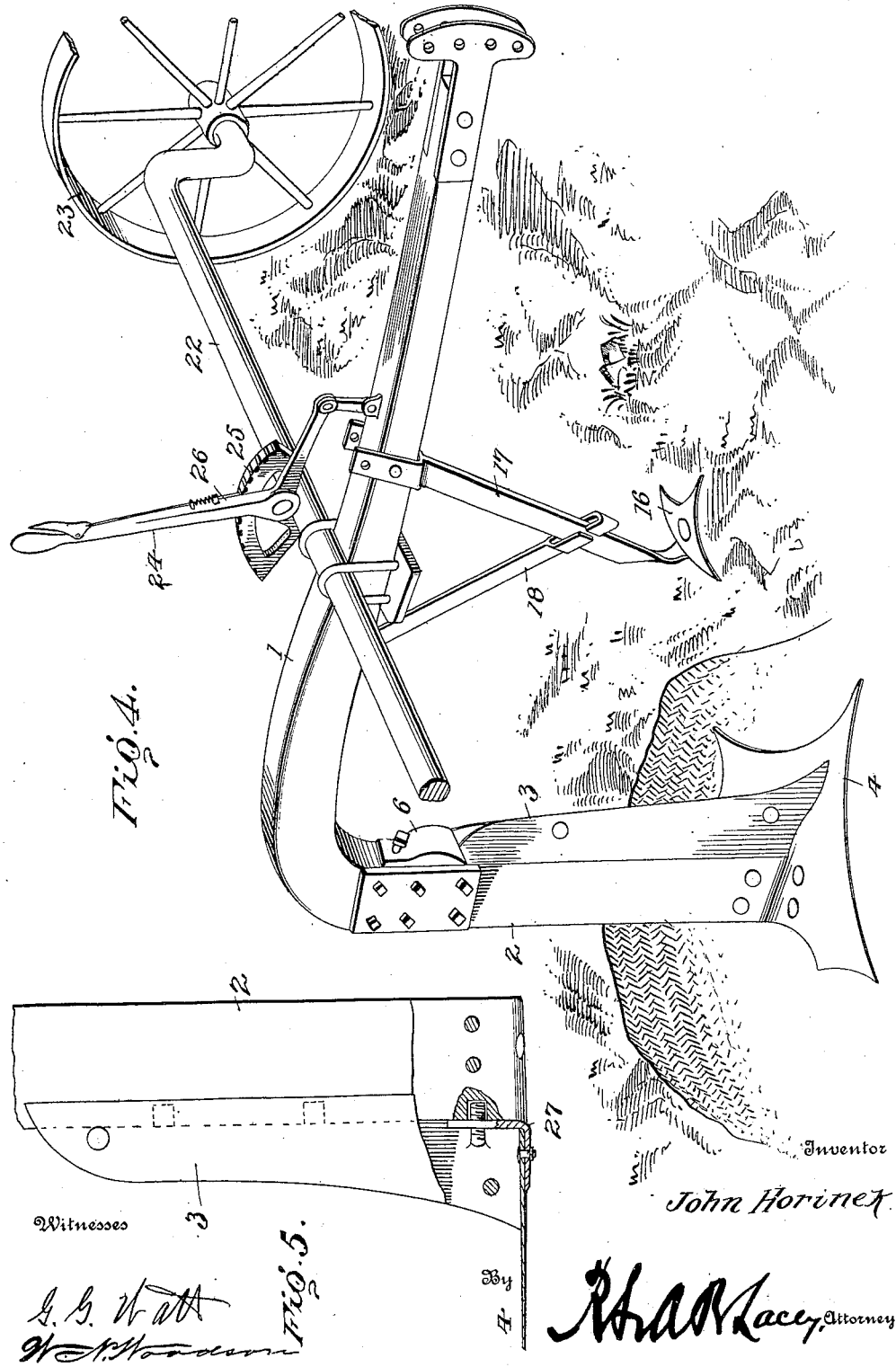

UNITED STATES PATENT OFFICE.

JOHN HORINEK, OF ATWOOD, KANSAS.

AGRICULTURAL IMPLEMENT.

No. 916,868.  Specification of Letters Patent.  Patented March 30, 1909.

Application filed June 3, 1908. Serial No. 436,373.

*To all whom it may concern:*

Be it known that I, JOHN HORINEK, citizen of the United States, residing at Atwood, in the county of Rawlins and State of Kansas, have invented certain new and useful Improvements in Agricultural Implements, of which the following is a specification.

The purpose of the present invention is to provide a novel machine for tilling the soil, being designed more particularly for loosening the earth to a comparatively great distance from the surface, thereby preparing the land for absorbing moisture and retaining the same for a great length of time, which is advantageous to the crop, particularly in places where rain fall is scarce.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of an implement embodying the invention. Fig. 2 is a vertical section of the lower portion of the standard, showing the cutter and shovel blade. Fig. 3 is a horizontal section on the line 4—4 of Fig. 2. Fig. 4 is a perspective view of a modification, showing the implement mounted upon the axle of a truck. Fig. 5 is a side view of the lower portion of the standard, a part being broken away.

Corresponding and like parts are referred to in the following description and indicated in all the views of the drawings by the same reference characters.

The beam 1 may be straight and of wood, as indicated in Fig. 1, or may be of metal and curved, as indicated in Fig. 4. The standard 2 may be separate from and attached to the beam, as indicated in Fig. 1, or may form a part of the beam, as illustrated in Fig. 4. A colter 3 is secured to the front side of the standard 2 and serves to cut turf and the like in advance of the standard, so as to render the progress of the same through the soil comparatively easy. The colter 3 may be of tempered steel or case hardened iron so as to resist wear. As shown in Fig. 3, the colter 3 is hollow and comprises rearwardly diverged members or wings which embrace opposite sides of the front portion of the standard to which they are secured in any convenient and substantial way. The lower end of the colter curves forwardly, as indicated most clearly in Figs. 1 and 4, thereby bracing the shovel blade 4 and forming a curved edge which operates by a shear action. A chain 5 or like securing means may connect the upper end of the colter to a standard 2, or as indicated in Fig. 5 a plate 6 may be connected to the standard, and an end portion extend in front of the upper end of the colter 3 and assist materially in holding the same in place. Plates 7 are applied to the opposite sides of the standard 2 and terminate short of the front edge thereof, as shown, to provide forwardly facing shoulders against which the spaced members of the colter are arranged to abut so as to be held against rearward displacement.

As indicated in Figs. 3 and 4, the standard comprises two plates 8, the lower ends of which, after passing through an opening in the shovel blade 4, curve outwardly in opposite directions, as indicated at 9 and receive fastenings 10 by means of which the shovel blade 4 is connected to the lower end of the standard. A cutter 11 is passed through openings formed in the standard and the plates 7 and is held in place by means of a set screw 12 threaded into an opening formed in the rear portion of the standard. The cutter 11 projects from opposite sides of the standard and is located a short distance above the shovel blade so as to cut the roots and to loosen the soil at a point between the surface and the shovel blade 4. The shovel blade 4 is flat and extends upon opposite sides of the standard so as to loosen the soil for a like distance upon opposite sides thereof.

When the implement is used as a walking plow or cultivator, handle bars 13 are provided and are connected at their lower ends to braces 14 which are interposed between the standard and the beam. Brackets 15, projected laterally from the beam, are connected at their outer ends to the handle bars 13 and strengthen and brace the same. A shovel blade 16 is arranged to operate in advance of the shovel blade 4 and removes trash and prepares the way in advance of the operating devices 4 and 11. The shovel blade 16 is attached to the lower end of a standard 17 which is connected at its upper end to the beam 1, a brace 18 serving to strengthen said standard. A pilot wheel 19 is provided at the lower end of a standard 20 and is adapted to run upon the ground and support the front end of the beam. A brace 21 serves to stay and fix the position of the standard 20.

In the construction shown in Fig. 4, the plow or cultivator is coupled to an axle 22, which is provided at each end with a ground wheel 23, thereby forming in effect a sulky plow or riding cultivator. The plow may be adjusted by means of a lever 24 which is mounted upon the axle 22 and has connection with the beam 1, said lever being held in the adjusted position by means of a notched bar 25 and coöperating latch bolt 26. To further strengthen the connection between the standard and shovel blade 4, an L-iron 27 is provided, as indicated in Fig. 5, the horizontal portion of said iron underlapping the shovel blade and secured thereto and the vertical member being connected to the standard 2.

Having thus described the invention, what is claimed as new is:

1. In an implement of the character described, the combination of a standard provided on its opposite sides with forwardly facing shoulders, a shovel blade secured to the lower end of the standard, and a colter detachably applied to the standard and embodying spaced members embracing the forward portion thereof and abutting against the corresponding forwardly facing shoulders.

2. In an implement of the character described, the combination of a standard provided at its lower end with a shovel blade and formed intermediate of its ends with a vertically disposed series of transverse openings, and a cutter designed to be secured in any selected one of the openings and projecting beyond the opposite sides of the standard, as and for the purpose specified.

3. In an implement of the character described, the combination of a standard provided at its lower end with a shovel blade and having a transverse opening, and a cutter secured in the said opening of the standard and projecting from opposite sides thereof.

4. In combination, a standard comprising complemental members placed side by side and having their lower ends outwardly and oppositely deflected, a shovel blade securing the said outwardly deflected ends, plates secured to opposite sides of the standard with their lower ends in contact with the shovel blade and their front edges terminating short of the front edge of the standard, a colter secured to the front edge of the standard and having its lower end curved forwardly and in contact with said shovel blade and connected thereto, and a cutter secured to the standard and the plates applied to the sides thereof and projecting from opposite sides of the standard.

In testimony whereof I affix my signature in presence of two witnesses.

JOHN HORINEK. [L. S.]

Witnesses:
  W. N. WOODSON,
  V. B. HILLYARD.